Oct. 21, 1958  R. N. MASTERSON  2,857,083

COMBINATION JAR LID AND MEASURING CUP

Filed Dec. 12, 1955

INVENTOR.
ROBERT N. MASTERSON
BY Toulmin & Toulmin
ATTORNEYS

United States Patent Office 2,857,083
Patented Oct. 21, 1958

2,857,083

COMBINATION JAR LID AND MEASURING CUP

Robert N. Masterson, Springfield, Ohio

Application December 12, 1955, Serial No. 552,648

4 Claims. (Cl. 222—361)

This invention relates to means and methods for dispensing materials from capped containers and is particularly directed to the provision of mechanism for the dispensing of measured quantities of materials from jars, such as jars containing ground or granulated materials.

A primary object of the invention is to provide, in combination with a jar lid, mechanism for the dispensing of coffee, for example, which mechanism in the non-actuated condition thereof effectively seals the contents of the jar from the atmosphere while yet providing a definite quantity of material in response to each dispensing actuation.

A further object of the invention is to provide a novel method for the dispensing of material in measured quantity from closed containers while yet maintaining the contents of the container substantially sealed.

An important object of the invention is to provide in combination with a cap of a container such as a jar lid measuring cup means of adjustable volumetric capacity.

The invention will be more fully understood by reference to the following detailed description and accompanying drawings wherein.

In the specific embodiments of the invention described hereinafter the container with the lid thereon is adapted to be inverted for dispensing. Slight shaking of the container insures of complete filling of the measuring cup means in all instances.

Figure 1:
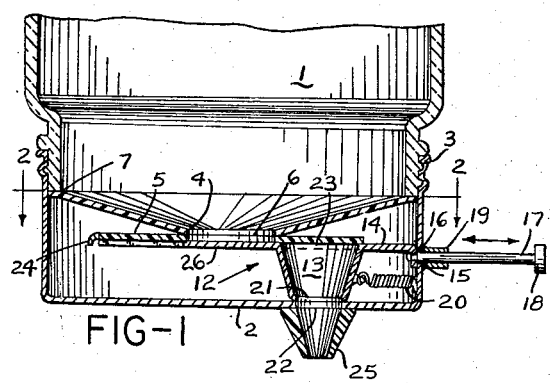
Figure 1 is a view in vertical cross-section of the dispenser of invention mounted on an inverted jar, the jar being broken away at the lower end thereof for compactness of illustration.
Figure 2:
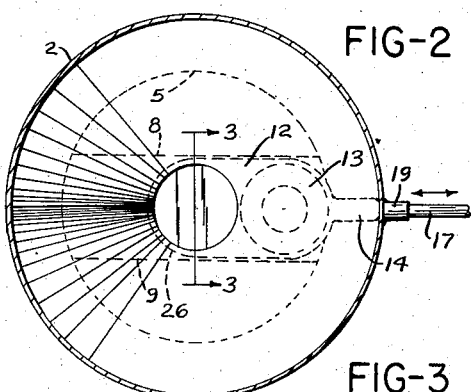
Figure 2 is a sectional view taken on line 2—2 of Figure 1.
Figure 3:
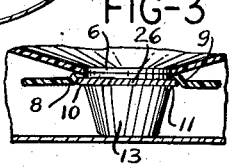
Figure 3 is a sectional view on line 3—3 of Figure 2.

Referring to the drawings, and particularly and initially to Figures 1-3, inclusive, the numeral 1 indicates generally a container in the form of a jar, such as a coffee jar, which container is adapted to be held in the hand.

As shown in Figure 1 the jar is in an inverted position and is provided with a cap or lid 2 which is screw-threaded at 3 and received on the jar in the usual manner, the screw threads of the cap cooperating with screw threads on the jar.

The numeral 4 indicates a centrally dished closure member for the jar and the numeral 5 designates a circular apertured plate or disc carried on the closure member. Formed through the closure member and cooperating with an aperture in the disc 5 is an aperture 6. The periphery of the closure member 4 abuts at flange 7 the upper periphery of the jar 1 and thus the jar is peripherally sealed by the closure member 4.

The closure member 4 is securely fixed to the lid 2 and adapted to abut against the jar periphery as shown in Figure 1 when the lid is screwed down onto the jar. The components, including the closure member 4, the plate 5 and lid 2 may be suitably of metal or of plastic, and the closure member may be secured on the jar lid either with adhesive or by spot welding, for example.

The circular plate 5, on the underside thereof, is provided with a pair of guide tracks 8, 9 disposed on opposite sides of the aperture 6, as is most clearly seen in Figure 3. These guide tracks extend in parallel relation transversely of the lid and receive oppositely disposed edges 10, 11 of a sliding panel 26 forming a portion of a measuring cup carrying and aperture-sealing member indicated generally at 12 in Figure 1.

The member 12 comprises an open ended conical measuring cup 13 carried on the panel. Rightwardly (Figure 1) the member 12 is provided with a narrowed panel portion or actuator-receiving portion 14 of the sliding panel 26, which actuator-receiving portion includes a depending flange 15. Secured to the depending flange 15 by a rivet as at 16 is a plunger rod 17 carrying knob 18. Sleeve 19 mounted on the outside of cap 2 guides the plunger rod 17 in a rectilineal movement indicated by the double headed arrow in Figure 1.

A spring 20 normally biases the member 12 to the Figure 1 position in which the smaller open end 21 of the measuring cup communicates with a port 22 in the top of the jar lid 2. The larger open end 23 of the measuring cup is in this Figure 1 position closed by the plate or disc 5.

As will be clearly seen from the drawings movement of the plunger rod 17 inwardly of the cap urges the measuring cup 13 to a position where the larger opening 23 of the measuring cup communicates with the aperture 6 of the closure member 4. Thus coffee or other material may be dispensed to the measuring cup in the inverted position of the jar shown in Figure 1. The coffee, for example, flows into the measuring cup to fill the same, the circular disc 5 limiting the flow of coffee to the measuring cup at the larger end thereof. In this inward position of the measuring cup, the open end 21 of the measuring cup means 13 is closed by the inner side of the top 2. Release of the plunger rod 17 permits the spring 20 to bias the measuring cup to its normal position over portion 22 and coffee is automatically dispensed as desired. A stop member 24 may be provided to limit the movement of the slidable measuring cup means 12; also a spout 25, if desired, may be provided about the port 22.

It is to be particularly noted that the edges 10, 11 of the panel 26 (Figure 3) which panel carries the measuring cup means, cooperate with the disc 5 to seal the aperture 6 completely in the normal position of the device, and accordingly entry of air to the contents of the jar is normally inhibited.

Figure 4:
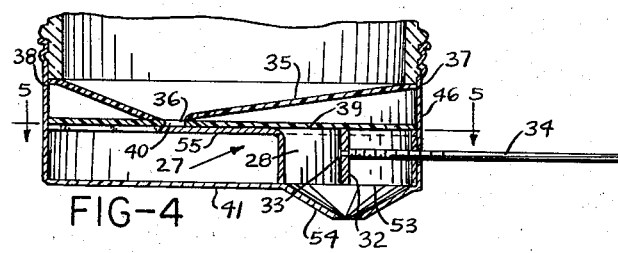
Figure 4 is a view similar to that of Figure 1 but illustrating a further embodiment of the invention in which the measuring cup volume is adjustable.
Figure 6:
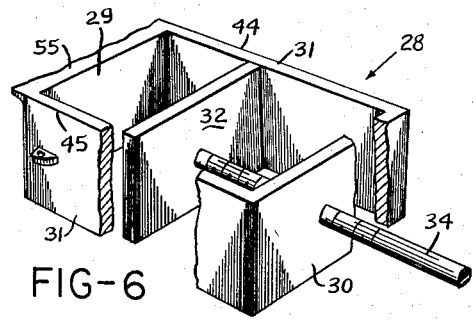
Figure 6 is an enlarged perspective view of the measuring cup of Figures 4 and 5 with parts broken away to particularly illustrate the adjustable arrangement of the measuring cup.
Figure 5:
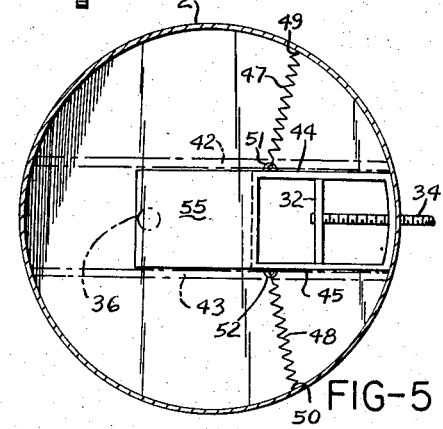
Figure 5 is a view taken on line 5—5 of Figure 4.

Referring now to Figures 4, 5 and 6, in the embodiment of the invention shown therein the numeral 27 designates a measuring cup carrying member. The measuring cup is indicated at 28 and comprises end walls 29, 30 and side walls 31. Cup 28 is open at the top and bottom ends and is provided with a movable partition 32. Partition 32 is apertured centrally and provided with a headed rivet 33 which is secured to a threaded plunger rod 34.

Plunger rod 34 is rotatable with respect to partition 32, but fixed against rectilineal movement with respect to the partition. Plunger rod 34 is threadedly received in the wall 30 of the cup 28 and rotational movement of the rod 34 adjusts the rectilineal position of the partition 32 with respect to the walls 29, 30, thereby varying the useful volume of the measuring cup 28.

The structure of the embodiment of Figures 4–6, inclusive, includes a closure member 35 provided with an off-center aperture 36. Peripherally the member 35 is adapted to abut the jar top periphery as at 37. Flange 38 of the closure member 35 assists the sealing relation of the closure member with the jar top periphery.

Closure member 35 is provided with a transversely extending plate 39 which is apertured at 40 to form communication between the interior of the inverted jar and the cap or lid 41. The disc 39 is provided with guide tracks 42, 43 which receive flanges or guide edges 44, 45 of the measuring cup 28.

The rod 34 passes freely through the right hand wall 46 of the cap or lid 41 and accordingly plunger movement of the rod 34 moves the slidable measuring cup in the guide tracks from the Figure 4 position to a position beneath the apertures 36, 40 for flow of material to the cup 28.

Springs 47, 48 secured respectively at 49, 50 to the lid 2 are secured also to lugs 51, 52 carried on the cup 28, normally biasing the cup to an initial sealing position of the aperture 36 from the port 53 of the cup for the dispensing of material. If desired a spout 54 may be provided for directing material from the cup 28 to a desired location.

It is to be noted particularly that panel 55 carrying the measuring cup 28 cooperates with the disc or plate 39 of the member 35 to effect sealing from the flow of contents of the jar into the cap other than at the area of the measuring cup.

Figure 8:
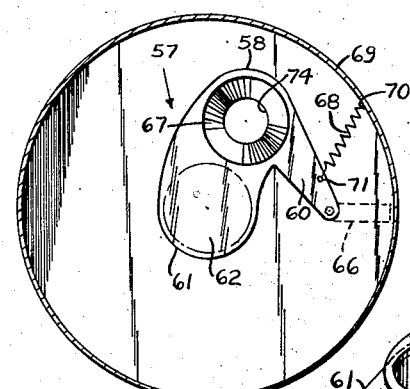
Figure 8 is a view taken on line 8—8 of Figure 7.
Figure 7:
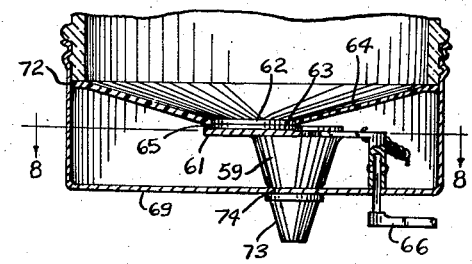
Figure 7 is a view similar to that of Figures 1 and 4 but illustrating a further embodiment of the invention.
Figure 9:
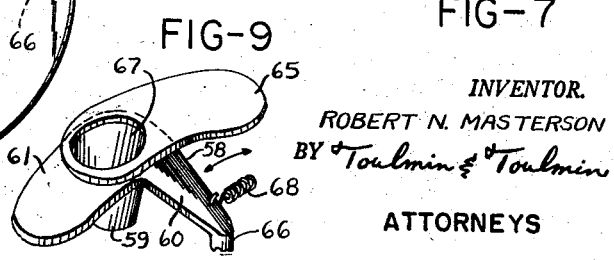
Figure 9 is a fragmentary perspective view of the measuring cup arrangement of Figures 7 and 8.

Referring now to Figures 7, 8 and 9, in which a further embodiment of the invention is shown, a measuring cup carrying member is indicated generally at 57 and comprises a bellcrank 58. A measuring cup 59 is open ended and generally conical shape and carried at about the junction of the arms 60, 61 of the bellcrank 58. The arm 61 in the normally closed position of the dispenser shown in Figure 7 closes a combination of apertures 62, 63 formed respectively in a closure member 64 and a plate member 65.

The bellcrank is provided at 66 with actuating means for movement of the bellcrank 58 from the Figure 7 position to a position where the larger end 67 of the measuring cup 59 communicates with the combination of apertures 62, 63.

Spring 68 is provided to normally bias the bellcrank 58 to the position of Figures 7 and 8 and for this purpose the spring is secured to the lid 69 at 70 and to the bellcrank arm 60 at 71. As in the prior figures the closure member is adapted to seal the jar at the upper periphery of the jar as is indicated at flange 72. Also the cap or lid 69 may be provided with a spout 73 if so desired, the spout being provided at the port 74 of the cap 69.

As will be obvious from the foregoing description the invention involves the provision of movable measuring cup means in a recess of a cap or jar lid, which measuring cup means is adapted to cooperate with a closure member carried by the jar lid, the combination being effective to seal the contents of the jar from the atmosphere when not in use.

The invention further includes plates such as indicated by the numeral 5 in Figure 1, by the numeral 39 in Figure 4, and by the numeral 65 in Figure 7, to prevent spillage of coffee should the structure be uprighted prematurely.

The components may suitably be of metal or of plastic and preferably the closure members as at 4, 35 and 64, have a degree of resiliency to permit intimate sealing contact thereof with the jar periphery.

It will be understood that this invention is susceptible to modification in order to adapt it to different usages and conditions and accordingly, it is desired to comprehend such modifications within this invention as may fall within the scope of the appended claims.

I claim:

1. In combination, a jar lid having a top and a vertically extending peripheral wall, a jar-closure member within the jar lid extending across the lid spaced from the top and defining with the lid top an interior recess of the lid, the closure member having an aperture therethrough opening unrestrictedly toward and leading into the recess, the closure member being dished toward the recess at the aperture and the closure member having a degree of resiliency and also having a flange on the outer periphery thereof joined to the vertically extending peripheral wall of the lid and sealable with the rim of a jaw when the lid is positioned on a jar, the jar lid top having a port therethrough leading outwardly of the recess, the port being offset from the aperture, measuring cup means in the recess movable between the said port and aperture, said measuring cup means having opposed open ends a first one of which is closed by the lid when the other end is communicable with the aperture and the said first one of which is communicable with the said port upon movement of the said other opening from the aperture, and actuator means for the measuring cup means, said actuator means extending in part through the lid to the exterior thereof.

2. In combination, a jar lid having a top and a vertically extending peripheral wall and a jar-closure member within and extending across the lid spaced from the top and defining with the lid top a recess, said closure member having an aperture therethrough opening unrestrictedly toward and leading into the recess and being dished toward the aperture at the recess, the lid top having a port therethrough offset from the aperture of the closure member, a plate in the recess carried by the closure member in spaced relation with the lid top, said plate extending around the said aperture, means for sealing the aperture from the port, said means including open-ended measuring cup means movable in the recess between the port and aperture and extending endwise between the interior of the lid top and the plate, the open end at the plate having rim means engageable with the plate at the aperture whereby the port is sealable from the aperture, the said closure member having a degree of resiliency and also having an integral peripheral flange thereof joined to the vertically extending peripheral wall of the lid and sealable with the rim of a jar when the lid is positioned on a jar, and actuator means extending through the lid and connected to the measuring cup means for moving the latter.

3. The combination, in a dispenser mechanism, of a jar lid having a top and a vertically extending peripheral wall, a jar-closure member within and extending across the lid, the closure member spaced from the top and defining with the lid top an interior recess of the lid, the closure member being dished toward the recess and being provided in a bottom-most peripheral portion thereof with an aperture opening unrestrictedly toward and leading into the recess, the lid top having a port leading from the recess to the exterior thereof, the port being offset from the aperture, a plate in the recess carried by the closure member in spaced relation with the interior of the lid top extending around the said aperture and having guide track means on either side of the aperture projecting in parallel relation across the plate in the direction of the port, a panel having an open-ended measuring cup extending therefrom and carried thereby between the ends thereof, the panel having opposed edges thereof supported in the guide track means for sliding guided movement of the panel and measuring cup means, the panel being slidable beyond the aperture to expose the measuring cup means to the aperture and retractable to the aperture to seal the aperture from the recess, the measuring cup means being adapted to be positioned at the port of the lid top in the sealed position of the aperture, the said closure member having a degree of resiliency and also having an integral peripheral flange thereof joined to the vertically extending peripheral wall of the lid and sealable with the rim of a jar when the lid is positioned on a jar.

4. In combination, a jar-lid having a top and a vertically extending peripheral wall and a jar-closure member within and extending across the lid spaced from the top and defining with the lid top an interior lid recess, said closure member having an aperture opening unrestrictedly toward and leading into the recess and being dished at the aperture toward the recess, the lid top having a port therethrough offset from the aperture, a bell-crank pivoted on the lid in the recess and carrying measuring cup means, the latter being open-ended and having a first open end communicable with the aperture in one position of the bell-crank and having a second open end thereof communicable with the port in another position of the bell-crank, the closure member having a plate carried thereon within the recess which plate extends around the said aperture and across the recess, in spaced relation with the lid, the plate having an opening communicable with the aperture the bell-crank being movable in contact with the plate and the first open end of the measuring cup means being closed by the plate when the second open end thereof is communicable with the said port, the said closure member having a degree of resiliency and also having an integral peripheral flange thereof joined to the vertically extending peripheral wall of the lid and sealable with the rim of a jar when the lid is positioned on a jar.

References Cited in the file of this patent

UNITED STATES PATENTS

| | | |
|---|---|---|
| 61,783 | Westerfield | Feb. 5, 1867 |
| 199,933 | Reed | Feb. 5, 1878 |
| 531,599 | Ross et al. | Dec. 25, 1894 |
| 1,880,823 | Cooper | Oct. 4, 1932 |
| 2,199,065 | Bell | Apr. 30, 1940 |
| 2,603,386 | Barnes | July 15, 1952 |